United States Patent [19]

Pernet

[11] Patent Number: 5,670,769

[45] Date of Patent: Sep. 23, 1997

[54] CASE FOR MICROCIRCUIT CARD READER

[75] Inventor: Michel Pernet, Pontarlier, France

[73] Assignee: Framatome Connectors International, Courbevoie, France

[21] Appl. No.: 405,986

[22] Filed: Mar. 17, 1995

[30] Foreign Application Priority Data

Mar. 21, 1994 [FR] France ................. 94 03265

[51] Int. Cl.$^6$ .................................................. G06K 17/06
[52] U.S. Cl. ...................... 235/441; 235/487; 235/492
[58] Field of Search ............................... 235/441, 487, 235/492

[56] References Cited

U.S. PATENT DOCUMENTS

| 4,449,775 | 5/1984 | Pommery et al. ............ 235/441 |
| 4,843,223 | 6/1989 | Shino ........................... 235/487 |
| 4,902,233 | 2/1990 | Maillot ......................... 439/62 |
| 5,252,815 | 10/1993 | Pernet ........................ 235/441 |

FOREIGN PATENT DOCUMENTS

| 480 334 | of 0000 | European Pat. Off. . |
| 274 302 | of 0000 | European Pat. Off. . |
| 274 288 | of 0000 | European Pat. Off. . |
| 2 687 238 | of 0000 | France . |
| 36 42 424 | of 0000 | Germany . |

*Primary Examiner*—Harold Pitts
*Attorney, Agent, or Firm*—Pollock, Vande Sande & Priddy

[57] ABSTRACT

A case for microcircuit card reader, comprising a case body, an electronic circuit incorporated into the case body, a device for guiding the card and holding it in place, and a connector incorporating elastic contact segments providing an electrical connection between conductors belonging to the card and the aforementioned electronic circuit. The connector (22, 23) is fastened to the body of the case (1). The connector (22, 23) may be integrated into the case body (2), this attachment being produced by duplicate molding of the elastic contact segments (23) in the body of the case (1).

11 Claims, 3 Drawing Sheets

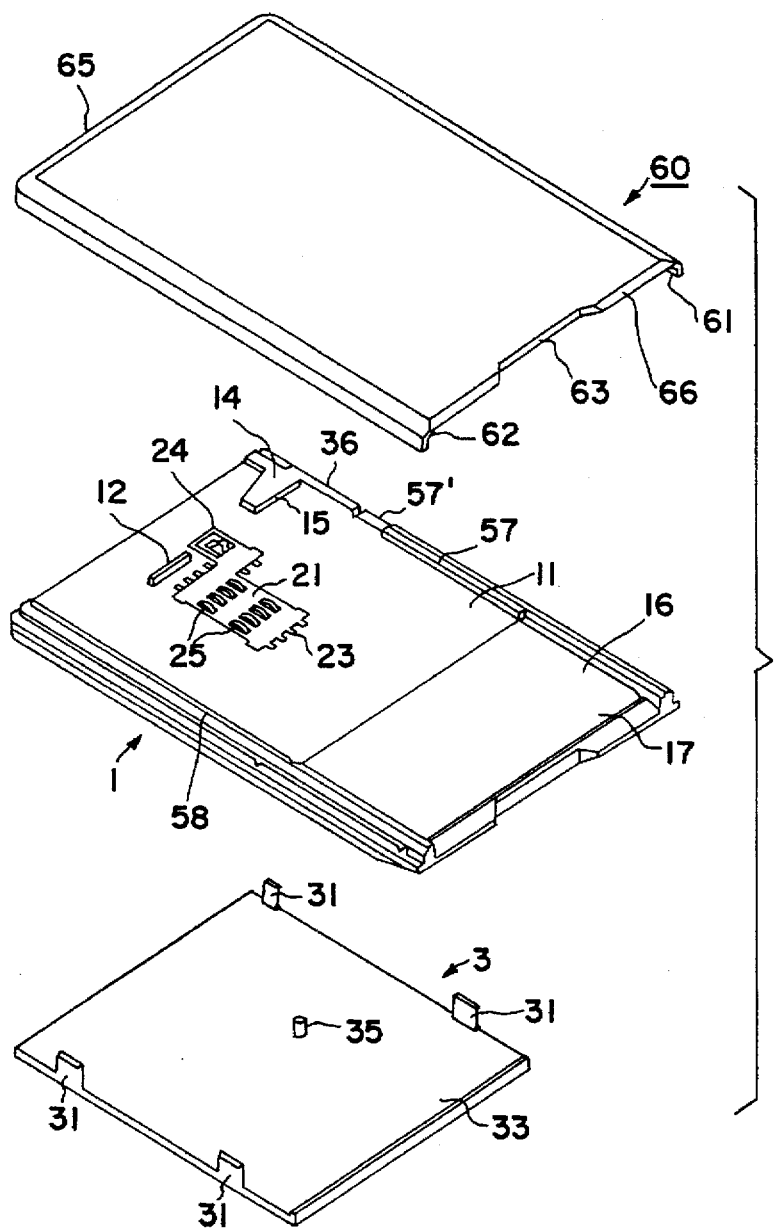
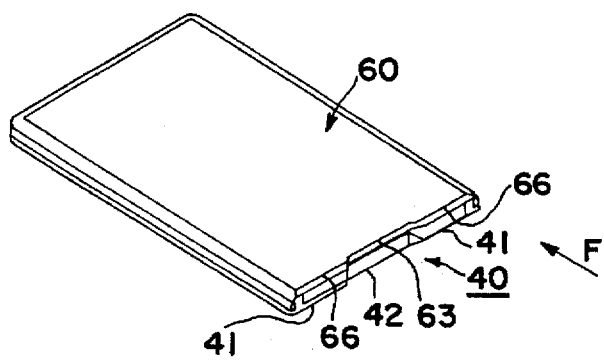

CASE FOR MICROCIRCUIT CARD READER

FIELD OF THE INVENTION

The present invention concerns a case for a microcircuit card reader, comprising a case body, an electronic circuit incorporated in the case body, a device for guiding and holding the card in place, and a connector incorporating elastic contact segments providing an electrical connection between the conductor elements belonging to the card and the aforementioned electronic circuit.

These card reader cases can be used, in particular, as devices called "free hand payment collectors." Such products incorporate an electronic infrared or HF remote data-interchange device and an interchangeable microcircuit card allowing identification of the bearer or used for prepayment, this unit fitting within a format a little larger than that of the card, most notably a PCM CIA format.

In this kind of case, the card must be held in a specific position relative to the contacts in the connector. Moreover, there must be no risk that the card will slide out of the case. This kind of case normally holds batteries which supply power to the electronic circuit and which must, therefore, be easily replaceable, while being held in place and protected in their housing.

The case must provide an electrical link between the microcircuit card connector and the electronic circuit, as well as correct positioning of the connector contacts on the contact areas of the card, these connectors lying within the plane of the card.

Moreover, the contact pressure between the contact segments and the card must fall within mandatory limits. In fact, should this pressure be too low, contact resistance is too high; if, on the other hand, the pressure is too high, the contacts will be exposed to wear and an excessively-high card-insertion force will be generated. From this perspective, it thus becomes necessary also to ensure good relative vertical positioning of the card in relation to the contact segments of the connector, i.e., in the direction perpendicular to the plane of the card.

BACKGROUND OF THE INVENTION

In conventional cases, the microcircuit card connector is positioned and soldered on the electronic circuit, position being ensured by the extension lugs of the contacts, which are soldered flat on the lower surface of the circuit. The electronic circuit is mounted on the case body, and the card-guide cover is, in turn, mounted on the case. In this configuration, the horizontal and vertical positions of the card are determined by the cover.

The precision of the vertical positioning is thus made dependent on the sum of the distance from the contact segments of the connector to the surface supporting the connector on the circuit, of the circuit-seating gap, of the distance between the circuit and cover supports, and, finally, of the precision of the cover (distance between the support surfaces on the case body and on the card). This stacking of dimensions tends to cause significant mechanical variation from one case to another, thereby damaging reliability.

SUMMARY OF THE INVENTION

According to a first feature, the present invention relates to a case for microcircuit card readers which does not exhibit the aforementioned disadvantage.

Accordingly, the invention concerns a case for microcircuit card readers, comprising a case body, an electronic circuit incorporated into the case body, a device for guiding the card and holding it in place, and a connector incorporating elastic contact segments providing for electrical connection between conductor elements belonging to the card and the aforementioned electronic circuit, and it is characterized by the fact that the connector is fastened directly to the body of the case.

In this way, the cumulation of dimensions is avoided and good reliability of the case is ensured.

The connector is advantageously integrated into the body of the case, this attachment being effected by duplicate molding of the elastic contact segments in the case body.

According to a second feature, the invention relates to a case for microcircuit card readers comprising a case body, an electronic circuit incorporated into the body of the case, a device for guiding the card and holding it in position, and a connector incorporating elastic contacts segments, which provide an electrical connection between conductors in the card and the aforementioned electronic circuit, wherein the case comprises a card-support element operating by elastic force.

According to one advantageous variant, the case according to the invention comprises a cover mounted on the case body, which delimits a space for insertion of the card and, in one card-insertion area, the case body incorporates a housing for an electric power-supply device, this housing comprising a cover which is held elastically in place by elastic means, first, in an open position in the absence of a card, and second, in a closed position when the card is inserted, by generating an elastic force which presses a rear area of the card down on an inner surface of the cover.

This arrangement makes it possible to support the card against the opposite side of the slot, without generating an exaggerated resistance to insertion.

According to this variant of the invention, the battery housing is located in the area of the insertion slot, and the housing cover forms one of the sides of this insertion slot, this cover performing the function carried out in prior art devices by an elastic roller. In other words, according to the invention the same elastic element is used both to open the battery housing when the batteries are replaced and to support the card.

The inner surface of the cover advantageously has an insertion edge fitted with a tab for holding the card in place. The case advantageously comprises at least one battery placed in the housing.

The aforementioned elastic means may be leaf springs arranged in the cover, which may form an electrical battery connection in series.

In a preferred embodiment, the cover, when in the open position, comes to be stopped against the aforementioned inner surface of the cover. The cover may then have a downward-curved insertion edge, and, in the open position, this curved edge has an end which remains positioned in a housing in the case body.

BRIEF DESCRIPTION OF THE DRAWINGS

Other features and advantages of the invention will become more apparent from a reading of the description below, which is provided by way of example in conjunction with the drawings, in which:

FIG. 3 is an exploded top perspective view of a case according to a preferred embodiment of the invention;

FIG. 4 is a perspective view of a case according to the invention;

DETAILED DESCRIPTION

Figure 5A:
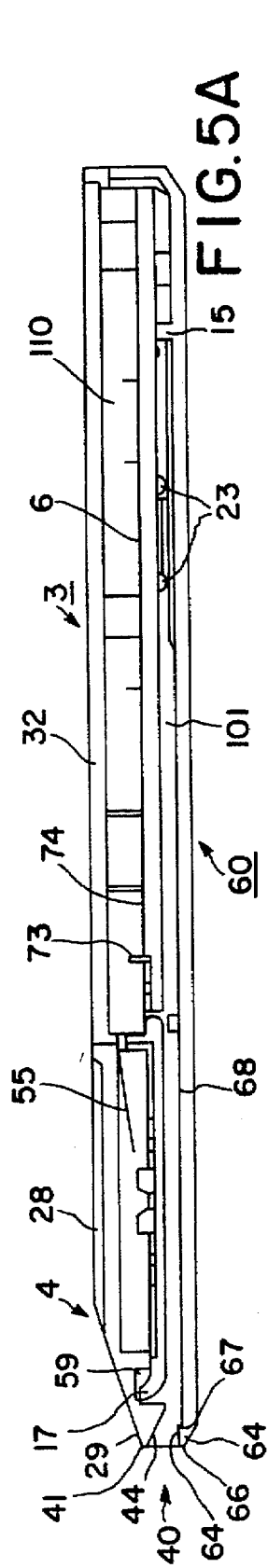
FIG. 5a is a longitudinal cross-section of a case according to the invention.

The drawings show a card reader case with a case body 1, whose lower face comprises a housing 2 incorporating a bottom 6 in which is housed a connector 22 incorporating contact segments 23 in electrical contact with the metallizations of an electronic circuit 11a positioned in the housing 2 (see FIG. 5a), and leaf springs 25 designed to come into mechanical and electrical contact with contact areas on the card. The connector 22 may also incorporate an end-of-travel contact 24 with the card 100.

According to the invention, the connector 22 is either mounted in the case body 2, or duplicate-molded during manufacture of the case.

Figure 5B:
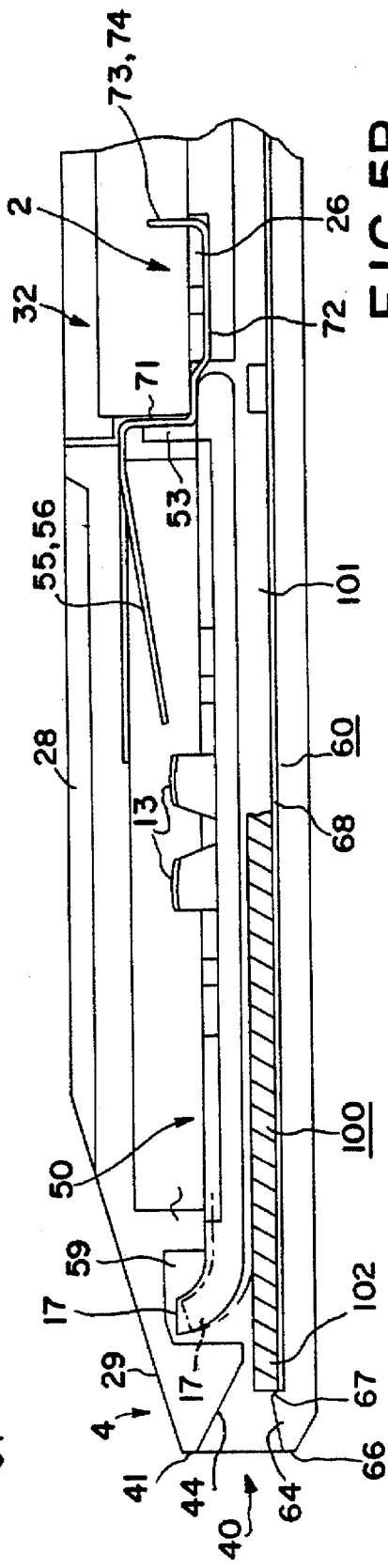
FIG. 5b is an enlargement of the card-insertion end thereof.

As shown in FIG. 5b, the microcircuit card 100 is inserted in a card housing 101 whose lower part is delimited by the upper plane 11 of the case body delimited on each side by the slide-rails 57 and 58, and by a hinged cover 16 for a housing 50 designed to hold batteries 90 arranged in circular recesses 51 and 52 delimited by peripheral areas 53 and 54. It will be noted that the slide-rails 57 and 58 extend along both the cover 16 and the housing 50. The upper part of the card housing 101 is delimited by the lower surface 68 of a cover 60 provided on each side with slide-rails 61 and 62 matching the slide-rails 57 and 58 of the body of the case 1.

The housing 101 incorporates an insertion slot 40.

Figure 2:
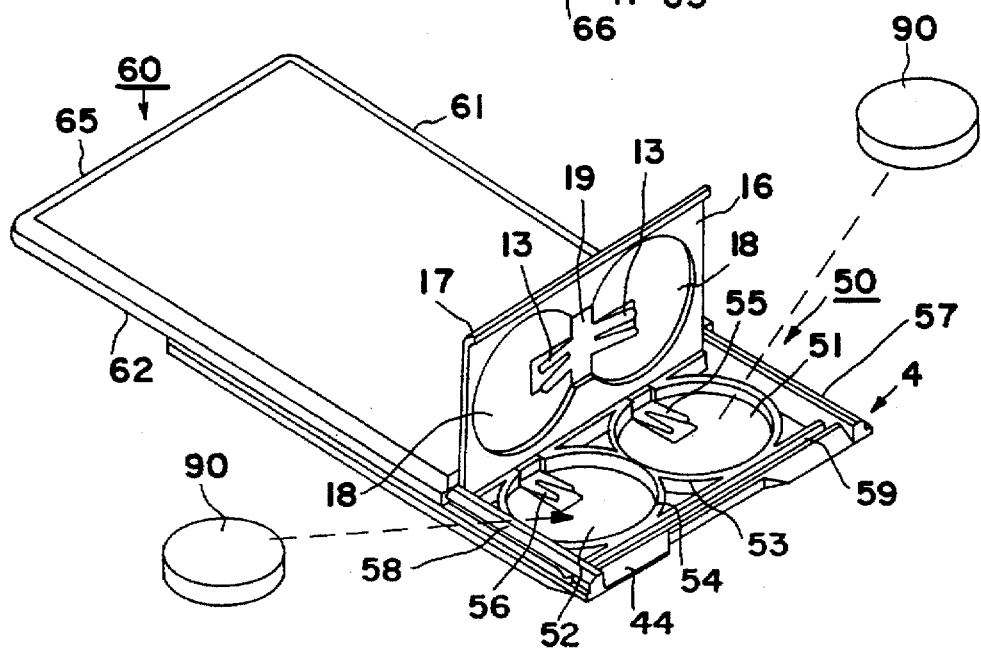
FIG. 2 is a top perspective view in perspective of a device according to the invention, shown in the battery-replacement position.

FIG. 4 illustrates the case in the assembled position, in which the cover 60 has been pushed down, so as to conceal and cover the battery housing 50, while, in FIG. 2, the cover 60, once it has been pushed back along the slide-rails 57, 58, is releases and can thus be opened in order to permit changing of the batteries 90.

FIG. 3 shows an end-of-travel card stop 12 and a sliding element 14 which comes to be positioned in a notch 57' in the slide-rail 57, so as to form a lateral stop for the card. The sliding element 14 has a stop-motion area 15 and slides in the slot 57' which makes the slide-rail 57 discontinuous. The sliding motion of element 14 is generated by the action of the user's finger on the edge 36 of the element 14, which is accessible from the exterior, and this allows the card 100 to be released from the housing 101.

A housing 2 in which the circuit 110 was positioned is reclosed by a movable cover 3 having lateral tabs 31, four in the case shown, which are inserted in four corresponding recesses 21 in an edge 25 arranged inside an outer contour 27 of the housing 2. The cover 3 also has, on its lower surface 33, a pin 35, which comes to rest on a matching pin 37 positioned in the central part of the bottom 6.

The lower surface 18 of hinged cover 16 is provided with a conductor having a central tab 19 and, on each side, two leaf springs 13, each of which comes to rest on an electrode of batteries 90, thereby forming a series connection between them. The inner surfaces of battery recesses 51 and 52 are provided; with an elastic element incorporating two leaf springs, 55 and 56, respectively, which are in electrical contact with the other electrode of the batteries 90.

As shown in FIG. 5b, these pairs of leaf springs 55, 56 are in electrical contact with power-feed tabs 73 and 74 of the electronic circuit 110.

Figure 6:
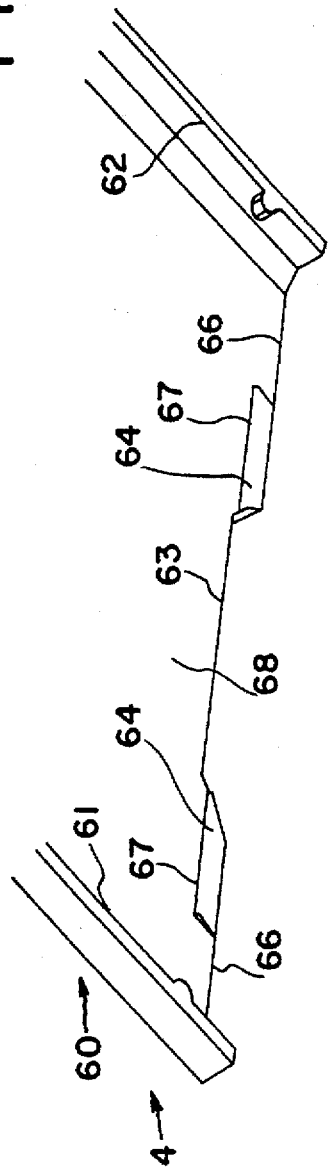
FIG. 6 is a bottom perspective view of detail of the cover of a case according to the invention.

When standard batteries are placed in recesses 51 and 52, the hinged cover 16 does not reclose completely, and an elastic force remains which pushes the cover 16 back against the lower surface 68 of the cover 10. In card insertion area 4, cover 16 comprises a downward-curved edge 17, which serves as an insertion profile for the card 100, thereby ensuring that, upon insertion of card 100, the cover 16 will be pushed downward by the card and close the battery housing 50. When the card is inserted completely so that its advancing end is stopped against the stop 12, 14, the rear edge 102 of the card engages in the vertical edge 67 of the tabs 64 provided on the lower edge of the cover 60, in the area 4 in which the card 100 is inserted (see FIG. 6). It will be noted, moreover, that the proximate edge 66 of the cover 60 has, in a central area, a notch 63 substantially perpendicular to the direction F in which the card 100 is inserted, and which extends beyond the vertical edges 67 of the tabs 64 positioned on either side of the notch 63.

Furthermore, a notch 42 is located opposite the notch 63 in the central part of the proximate edge 41 of the case body 2. Accordingly, card 100 may be released from the case by pressing down on it in order to remove it, possibly in cooperation with the sliding element 14.

The curved edge 17 of hinged cover 16 is housed in a recess 59 in the case body located beyond a bevelled insertion area 44.

When the card 100 is removed from the case, the combined effect of the elastic leaf springs 13, 55, and 56 causes the cover 16 to be pushed toward the top of the case, so that it comes into contact with the lower surface 68 of the cover 60. The curvature of the front edge 17 of the cover 16 is preferably sufficient to protect the batteries when this front edge is stopped against the cover of the case, when no card is inserted. To this end, it suffices that curved portion 17 is long enough for its end 17' to remain in the recess 59. In this way, a certain degree of impermeability is obtained in the area of the card-insertion slot 40, in particular impermeability to dust.

Figure 1:
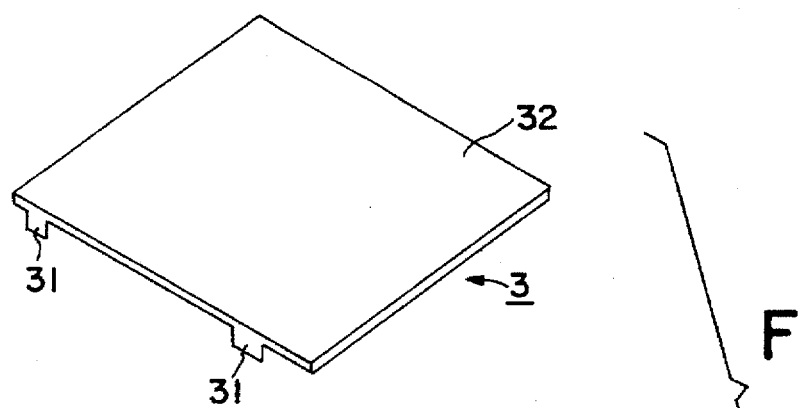
FIG. 1 is a bottom perspective view of a case according to a preferred embodiment of the invention.

As shown in FIGS. 1 and 3, more especially, it will be the connector 22 is positioned and fastened to the body of the case 1, for example by ultrasound soldering or by direct duplicate molding. The electronic circuit 110 (see FIG. 5a) is attached to the case body and accepts insertion of the tabs of contact segments of the connector 22. These tabs are either soldered on the surface in the electronic circuit 110, or are inserted into holes in this circuit to allow soldering or force-fitting. The horizontal positioning of the circuit on the case body must be precise enough to allow these tabs to be inserted easily.

The card is positioned vertically by means of the cover 60, and is positioned horizontally by means of the body of the case 1.

The precision of the vertical positioning is thus given by the sum of:

a) the distance from the contact segments to the surface supporting the connector on the case body;

b) on the case body, the distance between the connector and cover supports;

c) the precision of the cover (distance between the support surfaces on the case body and on the card).

Thus, comparison with the prior art, the invention omits one part (electronic circuit 110) from the series of dimensions relating to the vertical positioning of the contact segments 25 in relation to the card 100.

This means that the proper operation of the card/connector unit no longer depends on the mechanical precision of a circuit/connector assembly, thereby facilitating the manufacture of the electronic circuit and of the mechanical component.

What I claim is:

1. A case for a microcircuit card reader, said case comprising a case body having an upper face constituting a card receiving plane surface, an electronic circuit incorporated into a housing of said case body, a connector directly attached to said case body and incorporating elastic contact segments which provide an electrical connection between contacts of a microcircuit card and said electronic circuit, said case having a removable sliding upper cover containing longitudinally extending slide rails which, jointly with said card receiving plane surface, define a card receiving space.

2. A case for a microcircuit card reader, said case comprising a case (1) body having an upper face (11) constituting a card receiving surface, an electronic circuit (110) incorporated into a housing (2) of said case body, a connector (22) directly attached to said case body and incorporating elastic contact segments (23) which provide an electrical connection between contacts of a microcircuit card (100) and said electronic circuit, said case having a removable sliding upper cover (160), said connector being mounted through a wall separating said housing and a card-receiving space (101), and mounting on one side of said wall into said housing and on another side of said wall into said card-receiving space.

3. Case according to claim 1 or 2, wherein said connector (22, 23) is integrated into the case body (2), said attachment being achieved by duplicate molding of said elastic contact segments (23) in the body of said case (1).

4. Case according to claim 1 or 2, comprising at least one elastic element (13, 55) which supports the card by means of an elastic force.

5. Case according to claim 4, wherein, in an area (4) intended for insertion of said card (100), said case body (2) incorporates a housing (50) for an electric power-feed device, said housing (50) having a cover (16) which is held elastically in place by at least one of said elastic elements, on the one hand, in an open position when no card (100) is inserted, and, on the other, in a closed position when said card (100) is inserted, by exerting on said card (100) an elastic force which presses a rear area (102) thereof on an inner surface (68) of said cover (60).

6. Case according to claim 5, wherein said inner surface (68) of said cover (60) incorporates an insertion edge (66) provided with a tab (64, 68) which holds said card (100) in position.

7. Case according to claim 5, comprising at least one battery (90) placed in said housing (500.

8. Case according to claim 7, wherein said elastic elements (13) are leaf springs arranged in said cover (16).

9. Case according to claim 8, wherein said leaf springs (13) are arranged so as to form an electrical connection designed for operation of said batteries (90).

10. Case according to any of claims 5 to 9, wherein, in the open position, said cover (16) is stopped against said inner surface (68) of said cover (60).

11. Case according to claim 10, wherein said cover (16) has a curved insertion edge (17), and, in said open position, one end (17') of said curved edge (17) remains inserted in a housing (59) in said case body (2).

* * * * *